United States Patent
Chung

(10) Patent No.: US 8,854,655 B2
(45) Date of Patent: Oct. 7, 2014

(54) IMAGE FORMING APPARATUS AND METHOD OF GENERATING ADDITIONAL INFORMATION-ADDED DOCUMENTS

(75) Inventor: Tae-joon Chung, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1080 days.

(21) Appl. No.: 12/756,246

(22) Filed: Apr. 8, 2010

(65) Prior Publication Data

US 2011/0007350 A1 Jan. 13, 2011

(30) Foreign Application Priority Data

Jul. 10, 2009 (KR) ........................ 10-2009-0063170

(51) Int. Cl.
| | |
|---|---|
| *G06F 3/12* | (2006.01) |
| *G06K 15/00* | (2006.01) |
| *H04N 1/32* | (2006.01) |
| *H04N 1/00* | (2006.01) |
| *H04N 21/8358* | (2011.01) |

(52) U.S. Cl.
CPC .......... *G06F 3/1204* (2013.01); *H04N 1/32122* (2013.01); *H04N 1/00005* (2013.01); *H04N 1/32352* (2013.01); *H04N 2201/327* (2013.01); *H04N 21/8358* (2013.01); *H04N 2201/3271* (2013.01); *H04N 1/00037* (2013.01); *H04N 2201/3233* (2013.01); *G06F 3/1243* (2013.01); *G06F 3/1257* (2013.01); *H04N 1/00204* (2013.01); *H04N 1/00278* (2013.01); *H04N 1/00347* (2013.01); *H04N 1/00408* (2013.10); *H04N 1/00424* (2013.01); *H04N 1/00432* (2013.01); *H04N 1/00435* (2013.01); *H04N 1/00464* (2013.01); *H04N 1/00474* (2013.01); *H04N 1/00482* (2013.01); *H04N 1/32144* (2013.01); *H04N 1/32229* (2013.01); *H04N 1/32358* (2013.01); *H04N 2201/0039* (2013.01); *H04N 2201/0075* (2013.01)
USPC ....... 358/1.15; 358/3.28; 358/1.16; 358/1.17; 358/1.18; 382/100

(58) Field of Classification Search
None
See application file for complete search history.

(56) References Cited

U.S. PATENT DOCUMENTS

| | | | | |
|---|---|---|---|---|
| 7,224,820 | B2 * | 5/2007 | Inomata et al. | 382/100 |
| 7,770,013 | B2 * | 8/2010 | Rhoads et al. | 713/176 |
| 8,205,089 | B2 * | 6/2012 | Stefik et al. | 713/176 |
| 8,677,132 | B1 * | 3/2014 | Liao et al. | 713/176 |
| 2001/0042086 | A1 * | 11/2001 | Ueda et al. | 707/527 |
| 2004/0162854 | A1 * | 8/2004 | Maruta et al. | 707/104.1 |
| 2004/0258277 | A1 * | 12/2004 | Ueda | 382/100 |
| 2006/0212497 | A1 * | 9/2006 | Tomita | 707/205 |
| 2006/0285160 | A1 * | 12/2006 | Tomita | 358/1.16 |
| 2007/0030521 | A1 * | 2/2007 | Fujii et al. | 358/3.28 |
| 2007/0211954 | A1 * | 9/2007 | Ohara | 382/254 |
| 2009/0195821 | A1 * | 8/2009 | Matoba | 358/1.15 |

(Continued)

FOREIGN PATENT DOCUMENTS

KR 20080100677 11/2008

*Primary Examiner* — Satwant Singh
(74) *Attorney, Agent, or Firm* — Stanzione & Kim, LLP

(57) ABSTRACT

Provided are a method of generating an additional information-added document and an image forming apparatus performing the method, the method including inputting a property of the additional information to at least one document box in the image forming apparatus, storing a first document, which is an object document, to one of the at least one document box, generating a second document by adding additional information corresponding to a property that is set in the document box in which the first document is stored, to the first document, and storing the second document.

20 Claims, 7 Drawing Sheets

(56) References Cited

U.S. PATENT DOCUMENTS

| | | | |
|---|---|---|---|
| 2009/0234820 A1* | 9/2009 | Kaburagi et al. | 707/3 |
| 2010/0017803 A1* | 1/2010 | Shibuya | 718/100 |
| 2011/0047450 A1* | 2/2011 | Park et al. | 715/234 |
| 2013/0198173 A1* | 8/2013 | Kaburagi et al. | 707/722 |

* cited by examiner

IMAGE FORMING APPARATUS AND METHOD OF GENERATING ADDITIONAL INFORMATION-ADDED DOCUMENTS

CROSS-REFERENCE TO RELATED APPLICATIONS

This application claims priority under 35 U.S.C. §119(a) from Korean Patent Application No. 10-2009-0063170, filed on Jul. 10, 2009, in the Korean Intellectual Property Office, the disclosure of which is incorporated herein in its entirety by reference.

BACKGROUND

1. Field of the Invention

The present general inventive concept relates to an image forming apparatus and a method of generating additional information-added documents.

2. Description of the Related Art

In an image forming apparatus which performs at least one of the functions of the group consisting of printing, copying, scanning, faxing, e-mailing, server transmission, etc., an additional information-added document is generated and printed using a printer driver installed in a host device. The additional information-added document refers to an original document, which is an object document, to which additional information is added. The additional information may be a security mark that includes a phrase or an image showing that the object document is a security document. If a water mark option is selected as a printing option, a host device generates printing data that includes a water mark image and transmits the data to the image forming apparatus, and the image forming apparatus converts the transmitted data to image data and prints the image data. In this case, printing data including a water mark needs to be generated every time when a printing operation of a water mark added document is executed, and if the printing data is not to be printed on paper but to be transmitted via a fax, e-mail or a server, then the generation and transmission of the additional information-added document is not guaranteed.

SUMMARY

The present general inventive concept provides a method of generating and storing an additional information-added document and transmitting the same via one or more communication channels, and an image forming apparatus to perform the method.

Additional features and utilities of the present general inventive concept will be set forth in part in the description which follows and, in part, will be obvious from the description, or may be learned by practice of the general inventive concept.

However, the present general inventive concept is not limited thereto, and other embodiments may also exist, other than the exemplary embodiments of the present general inventive concept as disclosed herein.

Exemplary embodiments of the present general inventive concept provide a method of generating an additional information-added document of an image forming apparatus including at least one document box, the method including inputting a property of the additional information to the at least one document box in the image forming apparatus; storing a first document, which is an object document, to one of the at least one document box; generating a second document by adding additional information corresponding to a property that is set in the document box in which the first document is stored, to the first document; and storing the second document.

Exemplary embodiments of the present general inventive concept also provide an image forming apparatus to add additional information to a first document, which is an object document, including a receiving unit to receive the first document, a storing unit in which at least one of the group consisting of the received first document, a second document to which the additional information is added, at least one pattern corresponding to a property of the additional information, and at least one document box is stored, a user interface to input a property of additional information, that is set in the at least one document box, and a control unit to generate the second document by adding additional information corresponding to the property set in the at least one document box, in which the first document is stored, to the first document.

Exemplary embodiments of the present general inventive concept also provide a system to generate an additional information-added document, including a host device to transmit at least one of the group consisting of a first document, which is an object document, and information that sets an additional information property of at least one document box in an image forming apparatus and an image forming apparatus to receive the first document, to store the received first document to the at least one document box, and to generate a second document by adding additional information according to a property of an additional information of the document box in which the first document box is stored, to the first document, and to store the generated second document.

Example embodiments of the present general inventive concept also provide a method of generating an additional information-added document, the method including receiving a property of the additional information with an image forming apparatus, receiving a first document including at least one object with the image forming apparatus and storing the first document, generating a second document with the image forming apparatus by adding additional information according to the received property to the first document, and storing the second document.

Example embodiments of the present general inventive concept also provide a method of generating an additional information-added document, the method including receiving data of a first document with an image forming apparatus, generating a second document with the image forming apparatus by adding image data of a security mark to the received data, and storing the generated second document in a storage unit.

Example embodiments of the present general inventive concept also provide an image forming apparatus to add additional information to a first document received and stored by the image forming apparatus in a storing unit, including a user interface to receive an input of a property of the additional information that is set in the at least one document box, and a control unit to generate a second document by adding additional information corresponding to the property set in the at least one document box to the first document and to store the second document in the storing unit.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE EMBODIMENTS

Figure 1:
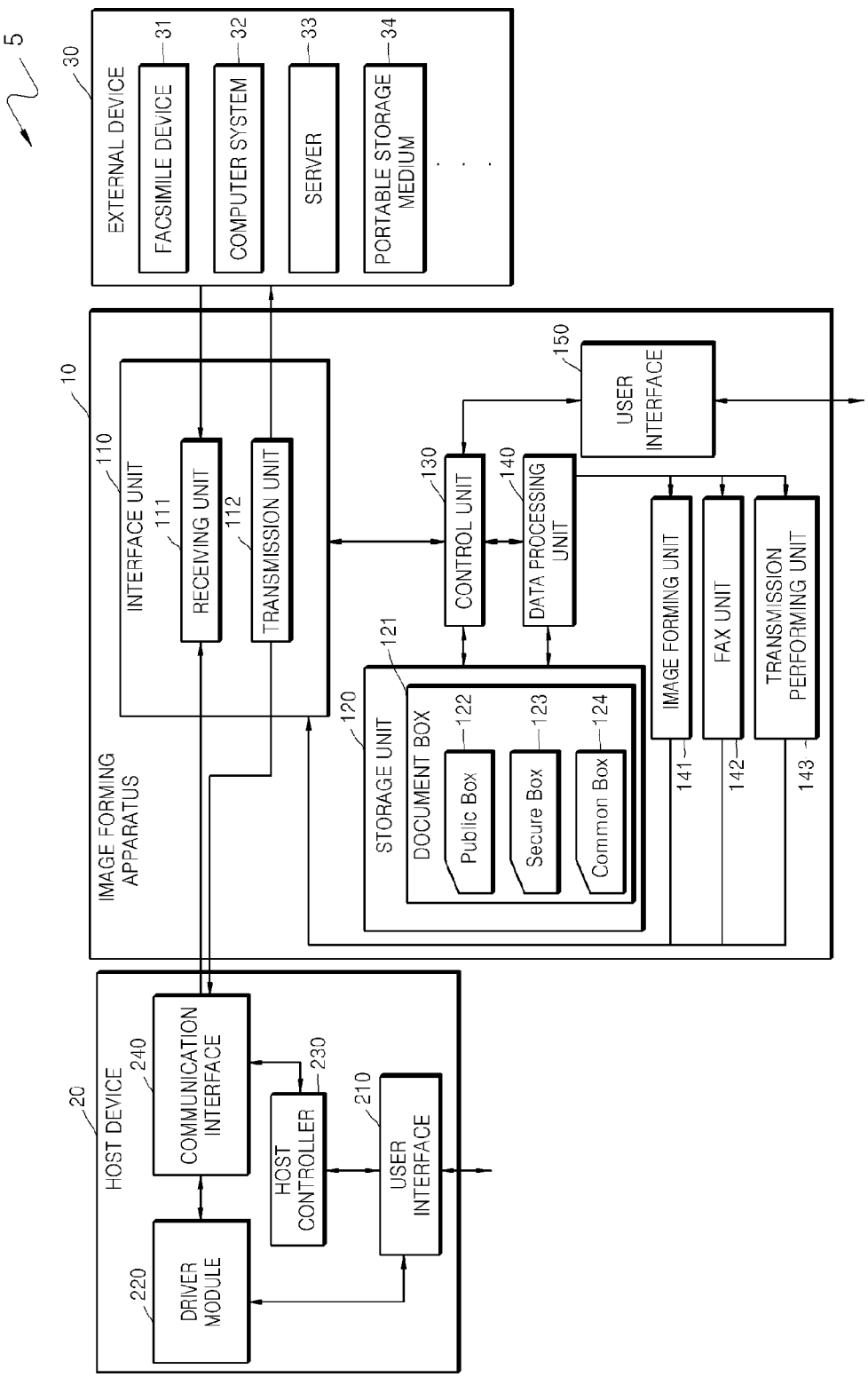
FIG. 1 is a schematic block diagram illustrating a system to generate an additional information-added document according to example embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic block diagram illustrating a system 5 to generate an additional information-added document, according to example embodiments of the present general inventive concept. Referring to FIG. 1, the system 5 to generate an additional information-added document can include an image forming apparatus 10, at least one host device 20, and an external device 30. The system 5 can include one host device 20 and one image forming apparatus 10, but the host device 20 may also be connected to a plurality of image forming apparatuses 10, or the image forming apparatus 10 may be connected to a plurality of host devices 20.

The image forming apparatus 10 according to the example embodiments of the present general inventive concept transmits and receives data to and from the external device 30 that is connectable to the image forming apparatus 10. The external device 30 includes at least one of a facsimile device 31, a computer system 32, a server 33, and a portable storage medium 34, but is not limited thereto and may include any device that is connectable to the image forming apparatus 10 and that transmits and receives data to and from the image forming apparatus 10. The image forming apparatus 10 transmits and receives data to and from the external device 30, to perform a fax transmission, e-mail transmission, server transmission (server message block/file transfer protocol transmission), or the like.

A document according to example embodiments of the present general inventive concept refers to not only data printed on paper, but also user data that is structuralized to be readable by the eyes of humans or a machine, or anything that can be exchanged between users an/or between systems. The document may also include an electronic document that can be recorded to a disk.

The image forming apparatus 10 can include an interface unit 110, a storage unit 120, a control unit 130, a data processing unit 140, an image forming unit 141, a fax unit 142, a transmission performing unit 143, and a user interface 150. The host device 20 includes a user interface 210, a driver module 220, a host controller 230, and a communication interface 240.

For clarity of description, only components related to example embodiments of the present general inventive concept will be described in the present specification. Accordingly, it will be understood by one of ordinary skill in the art that other general-use components than the components illustrated in FIG. 1 may also be included in the example embodiments.

The image forming apparatus 10 can be communicatively connected to the at least one host device 20 in a wired or wireless manner, and supports at least one of the functions of copying, fax transmission/reception, printing, e-mail transmission, data transmission to a server, and scanning of data. The image forming apparatus 10 may store data that is generated when performing one or more of the functions in the storage unit 120 in the image forming apparatus 10, and transmit the stored data at a time point (e.g., at a time that the user wants, at a predetermined time, etc.) via a fax, an e-mail, a server (server message block/file transfer protocol transmission), or print the stored data.

The interface unit 110 transmits and receives data to and from at least one of the host device 20 and the external device 30 via a network. The interface 110 according to example embodiments of the present general inventive concept may include a modem to transmit a fax, a network module to connect to a network or a universal serial bus (USB) host module to transmit data to the portable storage medium 34 of the external device 30.

Referring to FIG. 1, the interface unit 110 can include a reception unit 111 and a transmission unit 112. The reception unit 111 can receive a first document that is an object document. The first document can be at least one of fax data received via a fax, copy data received from a copying operation, data transmitted from the portable storage medium 34, e-mail data, data transmitted from a server, and data transmitted from the host device 20. The reception unit 111 may also receive scanning data from a document scanning operation. Data received through the reception unit 111 may be stored in the storage unit 120.

Data of a document received from the host device 20 can correspond to printing data to execute functions such as printing, fax transmission, e-mail transmission, server transmission, etc., with the image forming apparatus 10. The image forming apparatus 10 can store the printing data received from the host device 20 in the storage unit 120 and may perform one or more of the above-described functions by using the stored printing data.

The image forming apparatus 10 may receive data from a server, and store the received data in the storage unit 120. The server may include one or more servers (e.g., a mail server, a web server, a common server, etc.) that are communicatively connected to the image forming apparatus 10 in a wired or wireless manner.

The image forming apparatus 10 may receive data from the portable storage medium 34 that is connected to the image forming apparatus 10 and may store the received data in the storage unit 120. The data stored in the image forming apparatus 10 may be copied and stored in another storage location in the storage unit 120.

The transmission unit 112 can transmit a second document (i.e., the first document to which additional information is added) to at least one receiving device corresponding to a selection in the user interface 150. The at least one receiving device is a device to receive a document transmitted from the image forming apparatus 10 via e-mail, fax, FTP (file transfer protocol), or a network. In example embodiments of the present general inventive concept, the external device 30 is an example of a receiving device. The transmission unit 112 can perform at least one of the functions selected from a fax transmission, FTP transmission, e-mail transmission, transmission to a predetermined server, and a printing operation. The transmission unit 112 may transmit the second document, to which a property of additional information is added, to the at least one receiving device according to a preset manipulation method of a user or a controller. A preset manipulation method refers to one or more control operations to control the image forming apparatus 10 that are predetermined, in order to transmit data stored in the image forming apparatus 10 to at least one of the host device 20 and the external device 30.

The transmission unit 112 can transmit the second document according to the preset manipulation method. The image forming apparatus 10 according to example embodiments of the present general inventive concept may transmit the stored data to the host device 20 or the external device 30. Accordingly, the user or the controller of the image forming apparatus 10 may input the preset manipulation method of the image forming apparatus 10 in order to perform a transmission function of the transmission unit 112 via the user interface 150.

For example, when transmitting an e-mail by attaching a document stored in the image forming apparatus 10, the user or the controller inputs an address of a receiving device that is to receive the e-mail by using the user interface 150, selects a document that is stored in the image forming apparatus 10 and to be added, and transmits the e-mail by pressing an e-mail transmission start button. E-mail addresses can be stored in the image forming apparatus 10 according to a setting, and the user or the controller may select a receiving device by selecting at least one of the stored e-mail addresses.

It will be understood by one of ordinary skill in the art that the preset manipulation method according to example embodiments may be input via the user interface 150 of the image forming apparatus 10 or via the user interface 210 of the host device 20.

The transmission unit 112 transmits the second document via at least one of the channels for communication which are provided to perform a plurality of functions of the image forming apparatus 10. A channel according to example embodiments of the present general inventive concept generally refers to a communication channel that is a medium to transmit a signal from a transmitter to a receiver, but is not limited thereto.

The transmission unit 112 converts the second document, to which the additional information is added, into a digital signal to perform fax transmission, e-mail transmission, server transmission (SMB/FTP), etc. The data converted to a digital signal may be transmitted to the external device 30 to perform the function via a network. The network according to example embodiments includes both a wired network method and a wireless network method. Also, it will be understood by one of ordinary skill in the art that a network according to example embodiments of the present general inventive concept refers to the Internet, a local area network (LAN), a wireless LAN, a wide area network (WAN), etc. but may also be any type of network capable of transmitting or receiving data without being limited thereto. Also, the network according to example embodiments may include a telephone line to transmit and/or receive faxes.

An example of the additional information can be a security mark. For example, when transmitting data to which a security mark is added, the data including the security mark can be converted to fax data to be transmitted to the facsimile device 31, and the converted fax data may be transmitted to the designated facsimile device 31 (e.g., via a modem, etc.) which is an example of the interface unit 110.

According to another example, the interface unit 110 may transmit e-mails via a network, or transmit or receive data to and from the portable storage medium 34 via a data transfer channel.

The reception unit 111 according to example embodiments may receive printing data via a network from the host device 20, receive fax data from the facsimile device 31, or receive data from the portable storage medium 34. The transmission unit 112 can transmit the second document to the facsimile device 31, the computer system 32, the server 33, the portable storage medium 34, or the host device 20.

In the storage unit 120, the first document (e.g., an object document) can be received through the reception unit 111, and the second document (e.g., the first document to which additional information is added) at least one pattern corresponding to a property of the additional information, and at least one document box 121 can be stored. Referring to FIG. 1, the at least one document box 121 can include a public box 122, a secure box 123, and a common box 124. The storage unit 120 may include a program memory (not illustrated) and a data memory (not illustrated). Programs to control operations of the image forming apparatus 10 can be stored in the program memory. Data generated when programs are executed are temporarily stored in the data memory.

It will be understood by one of ordinary skill in the art that the storage unit 120 can be a storage medium such as a hard disk drive (HDD), a read only memory (ROM), a random access memory (RAM), a flash memory, or a memory card, or any other suitable memory device that may carry out the exemplary embodiments of the present general inventive concept.

The storage unit 120 may store data that is generated when performing functions such as printing, copying, scanning, e-mail transmission, fax transmission and reception, server transmission (SMB/FTP), etc. The control unit 130 can store the data in the document box 121, which is at least one virtual storage space. The document box 121 can denote a storage position in the storage unit 120. The document box 121 can be formed by the control unit 130, can exist in the storage unit 120 in the image forming apparatus 10, and can be a virtual storage space (e.g., a virtual storage space created with software). The image forming apparatus 10 may store data generated by functions such as printing, copying, scanning, e-mail transmission, fax transmission and reception, server transmission (SMB/FTP), etc., in the document box 121, and perform the plurality of the functions at a time point the user wants or at a predetermined time, with the data stored in the document box 121.

The document box 121 may include at least one storage space that is classified according to properties of data stored in the storage unit 120. For example, the document box 121 may include the public box 122, the secure box 123, and the common box 124.

Referring to FIG. 1, the document box 121 can include the public box 122, the secure box 123, and the common box 124.

The public box 122 is a storage space that can be created by one or more users, and data stored in the public box 122 may be modified, deleted, stored, or searched for by the one or more users.

The secure box 123 may be created by one or more users, but an access limit may be set to data stored in the secure box 123, and a user with an access right may modify, delete, store, and/or search for the data stored in the secure box 123. According to a setting, additional information may be added to the data stored in the secure box 123, and the data may be transmitted to the outside of the image forming apparatus 10 (e.g., to the host device 20, the external device 30, etc.).

For example, properties of the additional information that correspond to the document box 121 may be selected by the user or a controller of the image forming apparatus 10 via the user interface 150. That is, if an additional information property of the secure box 123 is set by the user or controller, additional information corresponding to the property may be added to the document stored in the secure box 123 and then transmitted. If a water mark such as "CONFIDENTIAL" is set as an additional information property, the water mark can be added to one or more documents that are stored in the secure box 123 and then transmitted.

Accordingly, a security mark may be added to results printed on paper and to documents that are transmitted via the facsimile device 31, the computer system 32, the server 33, the portable storage medium 34, or the host device 20. A security policy may be commonly applied to one or more documents distributed through the image forming apparatus 10. The rights for each document may be set individually.

The common box 124 can be a storage space that can be used by one or more users. The common box 124 may be generated in the at least one document box 121, and one or more users may modify, delete, store, or search for data stored in the common box 124. Accordingly, if a property of the data is not clear (i.e., defined) or if the transmitter or receiver of fax data is not clear, or if the data property does not match the property of the document box 121, the data may be stored in the common box 124.

The public box 122, the secure box 123, and the common box 124 are exemplary elements of the document box 121, and thus the document box 121 is not limited thereto. For example, the document box 121 may further include document boxes 121 that are classified by one or users, or may be classified by system 5 of FIG. 1.

Referring to FIG. 1 again, the control unit 130 can control one or more functions of the image forming apparatus 10. That is, the control unit 130 can control the interface unit 110, the storage unit 120, the data processing unit 140, the image forming unit 141, the fax unit 142, the transmission performing unit 143, and the user interface 150. Accordingly, the control unit 130 stores data received through the reception unit 111 to the document box 121 of the storage unit 120, and adds additional information to the stored data, wherein the additional information identifies the data as a security document. The control unit 130 can convert the data stored in the storage unit 120 to generate image data, can generate image data representing additional information, and can insert the image data representing the additional information to the image data that is generated by converting the data stored in the storage unit 120. That is, the control unit 130 may generate the second document(e.g., the first document stored in the document box 121, to which additional information corresponding to the property that is set to the document box 121 is added), and store the second document in the document box 121. The second document may be stored in the same document box 121 as the first document, or in a different storage space, according to the property of the second document to which the additional information is added. That is, the first document and the second document may be stored in the same storage space or in different storage spaces in the storage spaces of the document box 121.

The control unit 130 can convert data of the first document received from the receiving unit 111 to generate image data. The data received from the receiving unit 111 is data of the first document (e.g., object data), and an original document to be transmitted to the external device 30 from the image forming apparatus 10. That is, the data can be the original document to which additional information is not added yet. Also, the image data converted by the control unit 130 can be the original data that is converted to an image type and that is transmitted to the external device 30 via the image forming apparatus 10.

The image data according to example embodiments of the present general inventive concept includes one or more formats such as a bitmap (BMP), a joint photographic experts group (JPEG), a graphic interchange format (GIF), and a portable network graphics (PNG).

The control unit 130 can convert data received through the receiving unit 111 to image data by using emulation. Examples of emulation according to example embodiments of the present general inventive concept include printer control language (PCL) emulation, HP graphic language (HPGL) emulation, printer description language (PDL) emulation, KS/KSSM emulation, etc. The program to execute the emulation operations may be stored in the storage unit 120. However, if the first document is scanned, the obtained data is image data, and thus the conversion described above may not be performed.

The control unit 130 can generate image data including additional information by using at least one of the group of the data received from the receiving unit 111 and data read from the storage unit 120. The image data including the generated additional information can be added to the converted image data of the first document (e.g., an object document). The additional information can be a security mark that shows that the second document is a security document and can include at least one of a character and an image. The security document may be a document that can be read only by a user who has the right. In example embodiments, to identify the original document as a security document, additional information is added to the first document. That is, a security mark is overlaid on the original document. For example, a security mark image can be overlapped on the original document. The color depth of the security mark image can have a predetermined thickness so that the original document can be read without problems. The security mark may be a water mark showing a phrase including a text such as "CONFIDENTIAL," or a logo image of a company identifying the owner of the generated data.

The control unit 130 can generate image data including a security mark according to a property of additional information. The security mark can include at least one of a character and an image, and may include one or more properties. A property of additional information according to example embodiments may be a pattern, a position of the pattern, or a size of the pattern. The user may select the property of the additional information by manipulating the user interface 150 or using the host device 20. For convenience of description, the additional information according to example embodiments of the present general inventive concept is hereinafter described as a security mark formed of a character, an image, or any combination thereof, but it will be understood by one of ordinary skill in the art that the additional information is not limited thereto and may include any character, image, photographic image, mark, or a combination of these identify that a document, which is identified by the output data, is a security document.

For example, if the selected security mark is formed of a character, the control unit 130 generates image data that includes the security mark by using emulation. If the selected security mark is formed of an image, the control unit 130 may read the image of the security mark from the storage unit 120 when the image is stored as image data in the storage unit 120, or may generate image data representing the security mark if the image is not stored as image data in the storage unit 120.

Figure 2:
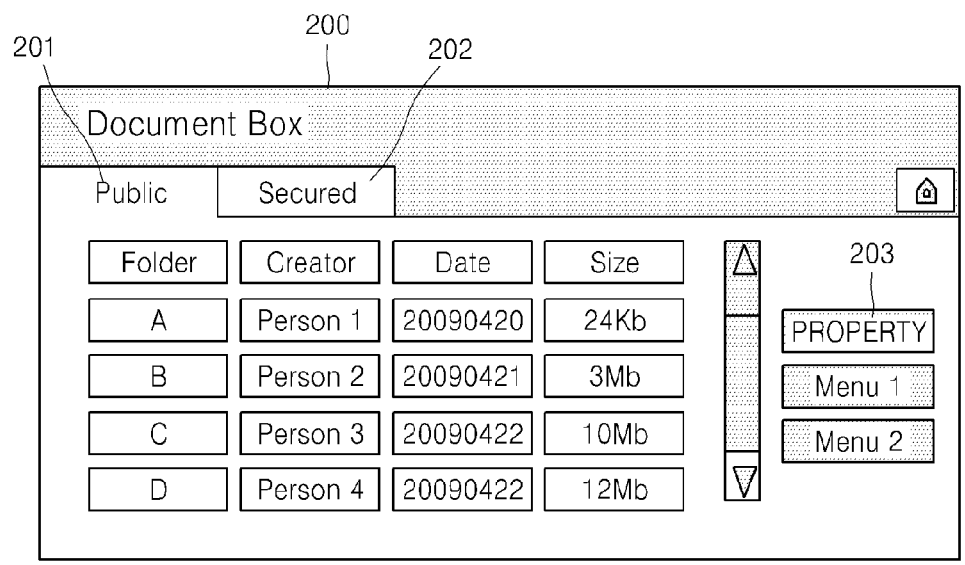
FIG. 2 illustrates a graphic user interface (GUI) of an image forming apparatus to select a security mark according to example embodiments of the present general inventive concept.

FIG. 2 illustrates a graphic user interface (GUI) of the image forming apparatus 10 to select a security mark. In FIG. 2, a document box 200 including a public tab 201, a secured tab 202, and a property 203, etc. is illustrated. The GUI in example embodiments of the present general inventive concept is a user interface formed of graphics, including an icon, a character, a mark, etc. A selection screen illustrated in FIG. 2 may be displayed on the user interface 150 of FIG. 1.

The document box 200 according to example embodiments of the present general inventive concept includes the public box (e.g., accessed by selecting the public tab 201) and the secure box (e.g., accessed by selecting the secured tab 202). If the user selects the public tab 201, a plurality of folders forming the public box may be displayed. In FIG. 2, the public box is illustrated including four folders (e.g., folders A, B, C, and D) as an example of the document box 200, but the public box is not limited thereto. Each folder may be classified according to its data generator (e.g., the creator, such as Person 1, Person 2, Person 3, or Person 4 illustrated in FIG. 2), or the security level of generated data. The property 203 is a menu to select a property of a security mark. The user may select the property of the security mark by selecting the property 203.

Figure 3:
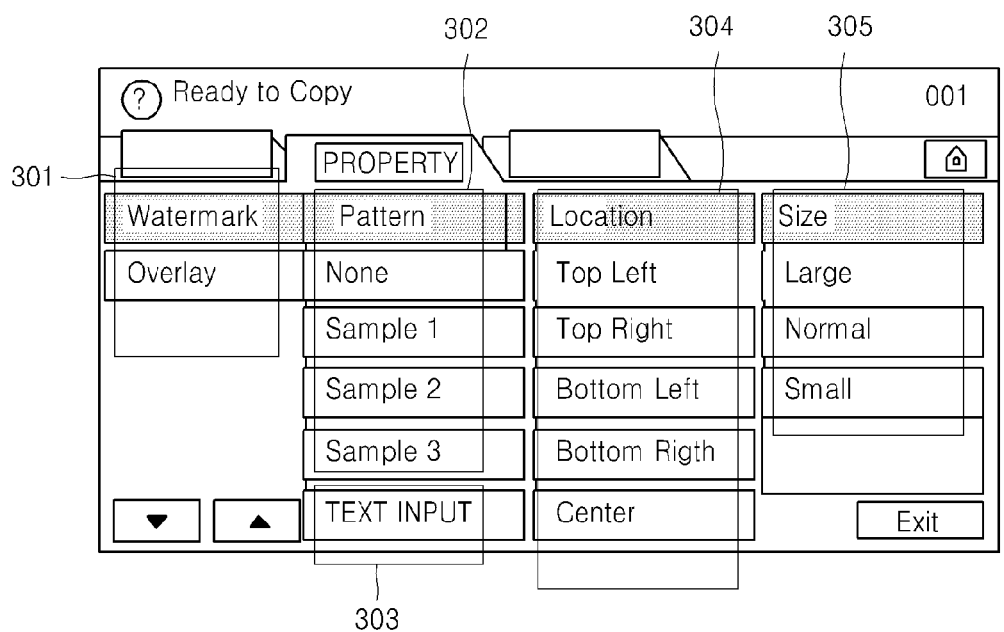
FIG. 3 illustrates a selection screen to select a character property of a security mark including characters according to example embodiments of the present general inventive concept.

FIG. 3 illustrates a selection screen to select a property of a character of a security mark including characters. The property of the character of the security mark can include a pattern, a position, a size, and the contents of the character of the security mark. Referring to FIG. 3, the selection screen to select the property of the character includes a character/image selection unit 301, a pattern selection unit 302, a text input unit 303, a position selection unit 304, and a size selection unit 305. The selection screen illustrated in FIG. 3 may be displayed on the user interface 150 of the image forming apparatus 10 of FIG. 1.

One of the group including a character and an image is selected via the character/image selection unit 301. Regarding the selection screen illustrated in FIG. 3, a security mark formed of a character can be selected.

The contents of a text including the security mark can be selected through the pattern selection unit 302. As illustrated in FIG. 3, None (no security mark), Sample 1, Sample 2, or Sample 3 may be selected. By selecting Sample 1, Sample 2, or Sample 3, a phrase including the security mark that is predefined and is stored in the storage unit 120 of the image forming apparatus 10 or in the host device 20 can be displayed. For example, Sample 1 may be "CONFIDENTIAL", Sample 2 may be "Samsung", and Sample 3 may be "DO NOT COPY", and they may be stored in the storage unit 120 of the image forming apparatus 10 or in the host device 20 illustrated in FIG. 1.

The text including the security mark may be input through the text input unit 303. That is, the user may directly input the text via the user interface 150 of the image forming apparatus 10, or the text may be received by the image forming apparatus 10. For example, the user may directly input the text by using a keyboard or a mouse of the image forming apparatus 10, or the selection screen may be converted to a screen for inputting keys and the user may directly input a text by touching the selection screen.

A position of the character including the security mark can be selected through the position selection unit 304. The position of the character of the security mark which is to be added to the data output through the image forming apparatus 10 can be determined by the position selection unit 304. As illustrated in FIG. 3, the position may be either top left, top right, bottom left, bottom right, or center, or any other suitable position to carry out the exemplary embodiments of the present general inventive concept.

A size of the character including the security mark can be selected through the size selection unit 305. As illustrated in FIG. 3, the size of the character may be large, normal, or small.

Figure 4:
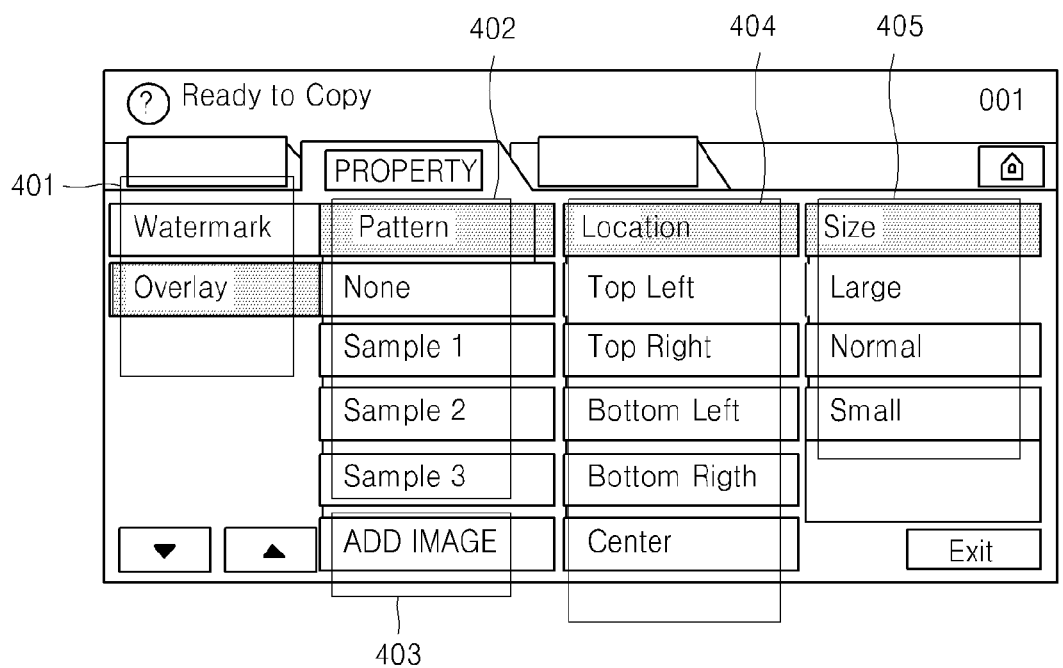
FIG. 4 illustrates a selection screen to select an image property of a security mark including an image according to example embodiments of the present general inventive concept.

FIG. 4 illustrates a selection screen to select an image property of a security mark that includes an image. Referring to FIG. 4, the selection screen to select an image property can include a character/image selection unit 401, a pattern selection unit 402, an image addition unit 403, a position selection unit 404, and a size selection unit 405. As described above, the selection screen illustrated in FIG. 4 may also be displayed on the user interface 150 of the image forming apparatus 10 illustrated in FIG. 1.

The character/image selection unit 401, the pattern selection unit 402, the position selection unit 404, and the size selection unit 405 illustrated in FIG. 4 are the same as or similar to the character/image selection unit 301, the pattern selection unit 302, the position selection unit 304, and the size selection unit 305 illustrated in FIG. 3, respectively, except that the security mark, which is formed of a character in the example embodiments described with reference to FIG. 3, is formed of an image. Thus, a description of the character/image selection unit 401, the pattern selection unit 402, the position selection unit 404, and the size selection unit 405 illustrated in FIG. 4 will not be repeated. However, an image including a security mark may be directly added to a document by the image addition unit 403. With the user interface 150 of the image forming apparatus 10, at least one of an image stored in the image forming apparatus 10 and an image stored in the host device 20 may be selected for use (i.e., the user interface 150 may receive a selection of an image stored in the image forming apparatus 10 and the image stored in the host device 20). If the user interface 150 of the image forming apparatus 10 is used, as described above with reference to the text input unit 303, the selection screen can be converted to a screen including images that are stored in advance, and the user may select an image by touching the selection screen.

The selection screens illustrated in FIGS. 2 through 4 are exemplary, and the selection screens for selecting a security mark are not limited thereto. Also, the properties of the character and the image illustrated in FIGS. 2 through 4 are examples according to the example embodiments of the present general inventive concept, and units to select other properties, such as a rotation angle selection unit for a character or an image, a depth selection unit, a density selection unit, a brightness selection unit, a black and white/color selection unit, etc. may be included. Information regarding a pattern corresponding to properties of the additional information, a position of the pattern, and a size of the pattern may be stored in the storage unit 120 of the image forming apparatus 10 or in the host device 20.

Referring to FIG. 1 again, the control unit 130 can generate image data according to the format of the character or the image including the selected security mark or reads image data to generate a security mark.

The control unit 130 can generate an image including additional information with at least one of the data obtained from the storage unit 120 and data obtained from the receiving unit 111. That is, the control unit 130 can generate image data including the additional information by emulation.

If the character or the image including the security mark corresponding to the additional information exists as printing data, the control unit 130 may generate image data by emulation. For example, if a security mark formed of characters such as "CONFIDENTIAL" is selected by the user, the control unit 130 may generate the security mark formed of characters such as "CONFIDENTIAL" as an image data format.

That is, the control unit 130 can read data representing additional information according to properties selected by the user or a basic setting from the storage unit 120 and convert the data into image data. For example, if a security mark formed of characters such as "CONFIDENTIAL" is selected, the control unit 130 generates image data represented by the data according to the selected properties.

Alternatively, the control unit 130 can read an image stored in the storage unit 120 and may use the read image as an additional information image. If the security mark is stored in the storage unit 120 in an image data format, the image data may be read from the storage unit 120 and be used as an additional information image.

When adding the security mark to the printing result of the image forming apparatus 10, the host device 20 can generate data that includes a document to which a security mark is added with the driver module 220. For example, data to form an image passes through an interface such as a graphic device interface (GDI) in an application of the host device 20 and is transmitted to the driver module 220. The driver module 220 can generate data that includes a document to which a security mark is added, by emulation that is integrated in the driver module 220. However, if a document to which a security mark is added is generated by the host device 20, the original document to which the security mark is added can be transmitted to the image forming apparatus 10, thereby damaging the original document, and an application for adding a security mark may be installed in the host device 20.

Accordingly, the image forming apparatus 10 according to example embodiments of the present general inventive concept may generate a security mark in the image forming apparatus 10 and add the generated security mark to data being transmitted. Also, data representing the first document, which is an object document, may be stored in an original state, and may add a security mark only when addition of a security mark is necessary. Data to which a security mark is added may be transmitted so as to be printed and/or to be transmitted via e-mail, a server, or a fax.

The image forming apparatus 10 may generate image data including a security mark in the image forming apparatus 10 or may read a security mark which is in an image data format from the storage unit 120. Accordingly, the image forming apparatus 10 may generate data to which a security mark can be added, and the data to which the security mark is added may be output from the image forming apparatus 10 to the external device 30.

Referring to FIG. 1 again, the control unit 130 can generate a second document, which is the first document to which additional information is added. The control unit 130 can add a security mark identifying that the data being transmitted is a security document, to generate data to which a security mark is added. That is, a new document, which is the first document including additional information, or a updated document that is formed by adding additional information to the first document, may be generated. The new document or the updated document can be the second document, and the second document may be transmitted to the external device 30.

For example, the control unit 130 overlays image data including an original document, which is the first document, with image data including a security mark which is the additional information. In the example embodiments of the present general inventive concept, overlaying refers to covering image data representing the original data with image data including a security mark. That is, the control unit 130 generates image data including both image data having the original document and image data including a security mark. The color saturation of the image data including a security mark generated by the control unit 130 is weaker than the color saturation of the image data including the original document, and thus the image data showing the original document and the image data including the security mark may be displayed as one piece of data.

Accordingly, the control unit 130 can generate the second document (e.g., the first document to which additional information corresponding to a property set in the document box 121, in which the first document is stored, is added, wherein the first document is the original document and object document). That is, if a property such as a water mark that has a pattern of a predetermined size such as "CONFIDENTIAL" positioned in a center of a document is set, the control unit 130 generates a second document by adding additional information corresponding to the property to the first document. That is, a text "CONFIDENTIAL" is added in a small size in the center of the document. The second document generated by the control unit 130 may be transmitted to the interface unit 110, the user interface 150, and the data processing unit 140.

The data processing unit 140 can convert data obtained from the receiving unit 111 and data stored in the storage unit 120 into files corresponding to functions to perform one or more functions of the image forming apparatus 10. For example, printing data received from the receiving unit 111 may be converted into a data format to perform a fax transmission, e-mail transmission, FTP transmission, etc. The data processing unit 140 is not limited thereto, and may not convert printing data if one or more functions may be performed with the printing data. The data processed by the data processing unit 140 can be transmitted to the image forming unit 141, the fax unit 142, and the transmission performing unit 143.

The image forming unit 141 prints a file received from the data processing unit 140, and the fax unit 142 transmits the file received from the data processing unit 140 to the facsimile device 31, and the transmission performing unit 143 transmits the file received from the data processing unit 140 to the computer system 32, the server 33, or the portable storage medium 34. It will be understood by one of ordinary skill in the art that although the image forming unit 141, the fax unit 142, and the transmission performing unit 143 are illustrated as units for processing the converted files in the data processing unit 140 according to example embodiments of the present general inventive concept, the present general inventive concept is not limited thereto, and that other function processing units for performing other kinds of functions of the image forming apparatus 10 may also be further included.

The user interface 150 can receive an input signal from the user and can output data to the user. Also, a GUI to select a property of additional information, which is to be set in the document box 121, and a receiving device of the additional information may be displayed on the user interface 150 illustrated in FIG. 1. For example, the user interface 150 may include one or more types of input/output devices included in the image forming apparatus 10, such as a mouse, a keyboard, a touch screen, a monitor, a speaker, any combination thereof, or any other suitable input device to carry out the exemplary embodiments of the present general inventive concept. That is, the user may set properties of additional information in the document box 121, and may select at least one external device 30 to transmit a document stored in the document box 121. Also, the user interface 150 may display a transmission result from the image forming apparatus 10 to at least one external device 30.

As described above, the image forming apparatus 10 may receive the first document, which is the object document, and transmit the second document, which is the first document to which additional information is added, to the external device 30. Since one of the original document data and data of the document to which a secure mark is added can be selected and stored, a security mark can be added to the original data without damaging the original data. Also, since addition of the security mark is performed in the image forming apparatus 10, the host device 20 can add a security mark without installing an additional application. With the data including a security mark that is stored in advance and the original document, the data to which the security mark is added may be used whenever the user wants, not only in printing the data on paper but also in e-mail transmission, fax transmission, copying, transmission to a server, etc. Thus a security document can be managed efficiently.

Referring to FIG. 1 again, the host device 20 can include the user interface 210, the driver module 220, the host controller 230, and the communication interface 240. The host device 20 can control the image forming apparatus 10 and may include any device that is connectable to the image forming apparatus 10 such as a general-use computer, a personal digital assistant (PDA), etc., to control the image forming apparatus 10.

The user interface 210 can receive an input signal from the user and can display information to the user. For example, if the host device 20 is a general-use computer, the user interface 210 includes input/output devices such as a mouse, a keyboard, a monitor, and a speaker.

The driver module 220 can include at least one program to control the image forming apparatus 10. The driver module 220 according to example embodiments of the present general inventive concept can include a printer driver, a scanning driver, etc. For example, when adding a security mark to a document stored in the host device 20 and transmitting the document via a fax, the driver module 220 of the host device 20 can convert the document into data that can be processed by the image forming apparatus 10, by emulation. The data can be transmitted to the image forming apparatus 10, and the image forming apparatus 10 can receive data through the receiving unit 111 and can add a security mark to the data as described above, thereby transmitting the document via the transmission unit 112. That is, the host device 20 transmits printing data of a document that is to be transmitted with the image forming apparatus 10, and the image forming apparatus 10 receives the printing data to perform functions that are controlled by the host device 20.

The host controller 230 can control the image forming apparatus 10 with the host device 20. The host controller 230 may include a web application to control the image forming apparatus 10. The web application may provide a web user interface (UI) to control the image forming apparatus 10. The host device 20 according to example embodiments of the present general inventive concept may select a property of a security mark which is an example of additional information, with the web UI provided by the host controller 230.

Figure 5:
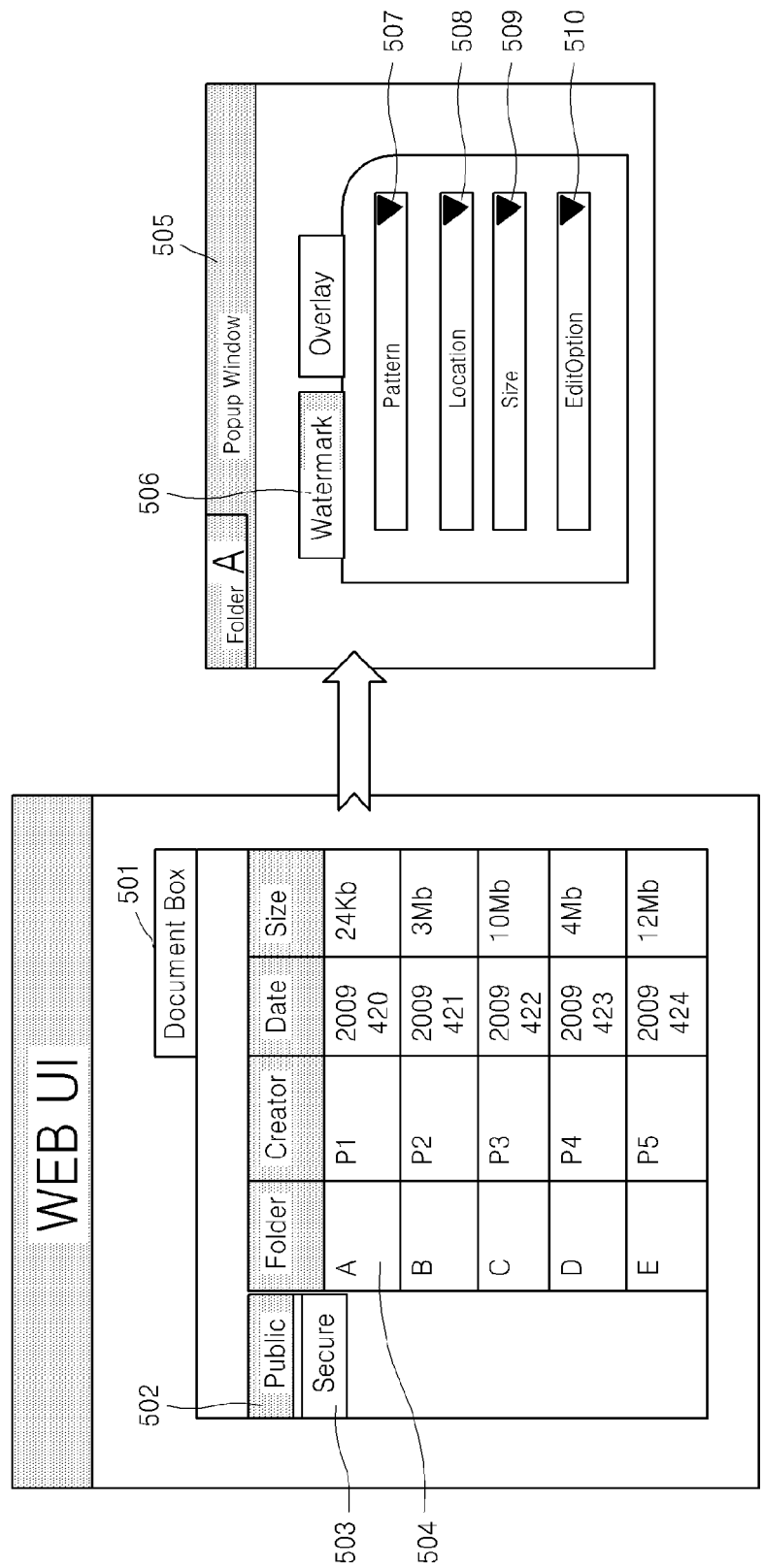
FIG. 5 illustrates a web user interface (UI) to select a property of a security mark according to example embodiments of the present general inventive concept.

FIG. 5 illustrates an example of a web UI for selecting a property of a security mark, according to example embodiments of the present general inventive concept. FIG. 5 illustrates an example of a selection screen that is displayed on the user interface 210 of the host device 20.

Referring to FIG. 5, a document box 501 may include a public box 502 and a secure box 503. The public box 502 may include a plurality of folders, one of which is a folder A 504, for example. The document box 501 can be connected to the document box 121 stored inside the image forming apparatus 10, and may be displayed on the user interface 210 of the host device 20 illustrated in FIG. 1. A folder may refer to a storage space that is classified by one or more properties existing in the document box 501. When the folder A 504 is selected by the user interface 210, a popup window 505 may be displayed on the user interface 210 of the host device 20. The popup window 505 can include a character/image selection unit 506, a pattern selection unit 507, a position selection unit 508, a size selection unit 509, and an editing option 510, which are the same as those illustrated in FIGS. 2 through 4, and thus detailed descriptions thereof will be omitted.

Figure 6:
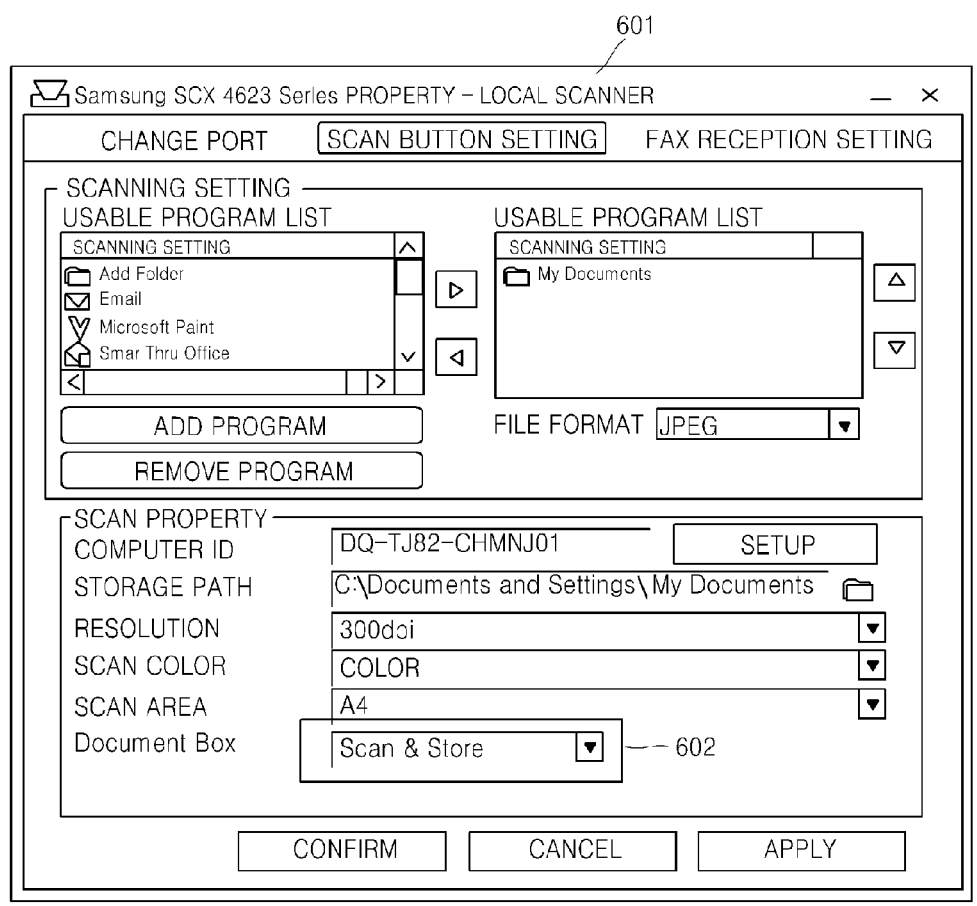
FIG. 6 illustrates a method of storing a second document to a document box in a host device according to example embodiments of the present general inventive concept.

FIG. 6 illustrates a method of storing a second document to the document box 121 in the host device 20 according to example embodiments of the present general inventive concept. The user may select whether to store data that is obtained by scanning in the image forming apparatus 10, with the host device 20. FIG. 6 illustrates an example of an option selection screen 601 displayed on the user interface 210 of the host device 20.

Referring to FIG. 6, the option selection screen 601 and a document box storage selection unit 602 are illustrated. Whether to store scanning data in the document box 121 or not may be selected with the driver module 220 and the host controller 230 of the host device 20. The user can control the document box storage selection unit 602 by manipulating the user interface 210. As illustrated in FIG. 6, by selecting Scan & Store from the document box storage selection unit 602, the scanning data may be stored in the document box 121 after scanning.

The communication interface 240 may transmit or receive data via the image forming apparatus 10 and a network. As described above, the network can include a wired network, a wireless network, or any combination thereof.

As described above, the host device 20 may add a security mark to data with the driver module 220, or may also generate data to which a security mark is added without installing an application for adding a security mark, with the image forming apparatus 10, and output the generated data to the external device 30.

The host device 20 and the image forming apparatus 10 according to example embodiments of the present general inventive concept may include one or more processors. Alternatively, each element of the host device 20 and the image forming apparatus 10 may correspond to one or more processors. It will be understood by one of ordinary skill in the art that a processor may be realized using an array of multiple logic gates or using a combination of a general-use microprocessor and a memory in which programs that can be executed in these microprocessors are stored.

Figure 7:
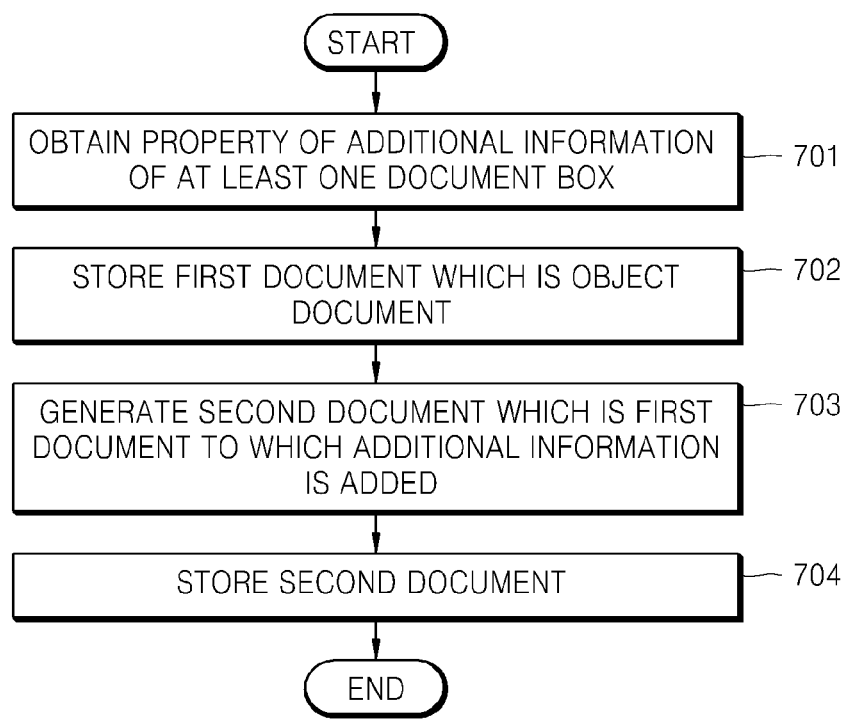
FIG. 7 is a flowchart illustrating a method of transmitting a second document to which additional information is added according to example embodiments of the present general inventive concept.

FIG. 7 is a flowchart illustrating a method of generating a second document to which additional information is added, according to example embodiments of the present general inventive concept. Referring to FIG. 7, the method of generating a second document to which additional information is added includes operations that are time-sequentially processed in the system 5 illustrated in FIG. 1 to generate an additional information-added document. Accordingly, although not described below with reference to example embodiments, description with respect to the system 5 illustrated in FIG. 1 to generate additional information added document will also be applied to the method of generating the second document which will be described hereinafter with reference to FIG. 7.

In operation 701, the user interface 150 receives a property of additional information of at least one document box 121. The user may select a property of additional information which is to be added to a document stored in the document box 121 with the user interface 150 of the image forming apparatus 10. Alternatively, the control unit 130 (illustrated in FIG. 1) may select a property of additional information which is to be added to a document stored in the document box 121

In operation 702, the control unit 130 can store a first document, which is an object document that is received from the receiving unit 111, in the storage unit 120. Here, the first document may be classified in the at least one document box 121 and may be stored therein in the storage unit 120 according to properties of the first document. For example, if a first document is a security document and additional information corresponding to a security mark is added to the first document, the first document may be stored in the secure box 123 of the document box 121.

In operation 703, the control unit 130 can add additional information corresponding to a property that is set in the document box 121 to the first document stored in the at least one document box 121 to generate a second document. The property set in the document box 121 may be a property that is selected by the user interface 150 or the control unit 130 in operation 701 or a default property. That is, the control unit 130 can generate a second document, which is the first document to which a security mark corresponding to additional information is added, by emulation.

In operation 704, the control unit 130 can store the second document in the storage unit 120. The second document may be stored in the same storage space as the first document or in a different storage space from the first document. The stored second document can be transmitted to at least one receiving device according to a preset manipulation. The at least one receiving device includes the facsimile device 31, the computer system 32, the server 33, the portable storage medium 34, etc., and the transmission unit 112 can perform at least one of the fax transmission, FTP transmission, e-mail transmission, transmission to a predetermined server, and printing.

Figure 8:
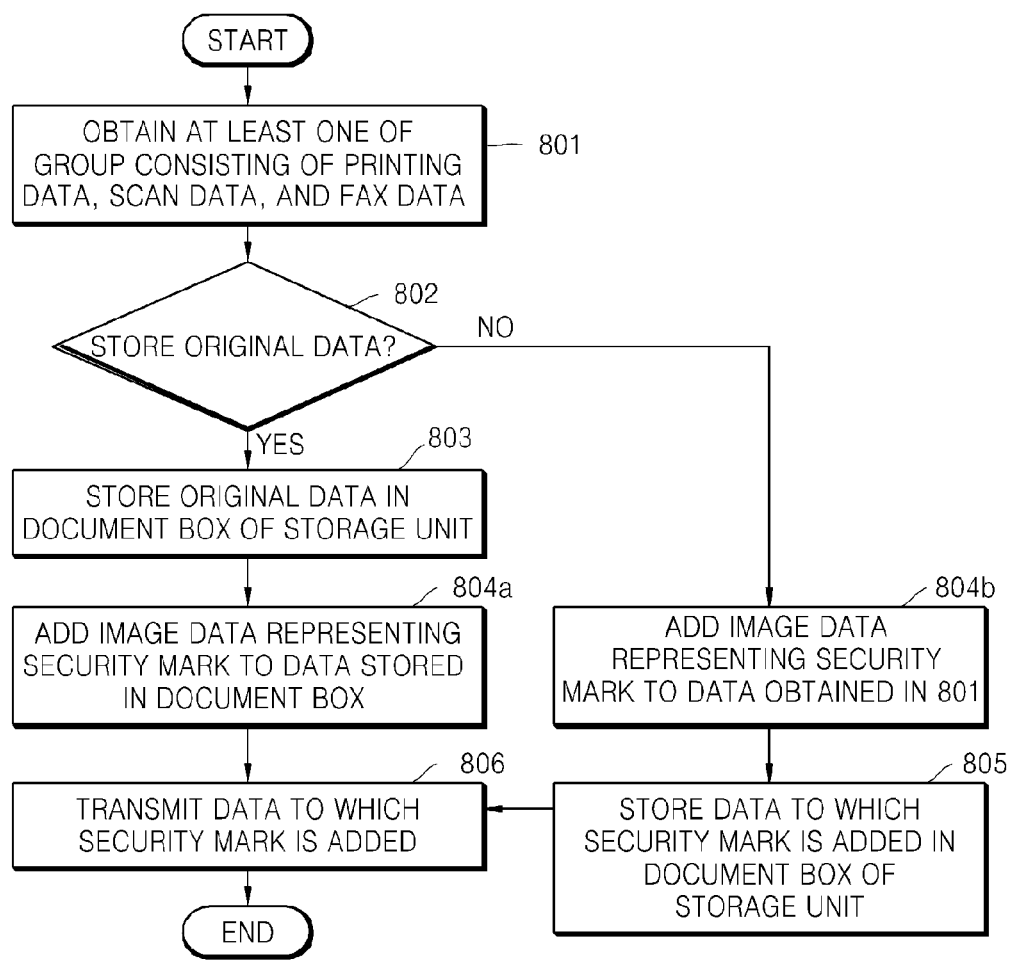
FIG. 8 is a flowchart illustrating a method of determining whether to store a first document and a second document according to example embodiments of the present general inventive concept.

FIG. 8 is a flowchart illustrating a method of determining whether to store a first document or a second document, according to example embodiments of the present general inventive concept.

In operation 801, the image forming apparatus obtains at least one of the printing data, scanning data, and fax data that represents the first document. The receiving unit 111 can receive the data from at least one of the storage unit 120, the host device 20, and the external device 30 illustrated in FIG. 1.

In operation 802, whether to store original data representing the first document is selected. If the original data is stored, the method proceeds to operation 803, and if not, the method proceeds to operation 804*b*. Whether to store the original data is selected through the user interface 210 of the host device 20 or the user interface 150 of the image forming apparatus 10. The storing of the original data may be selected at the moment the original data is received by the image forming apparatus 10 or be conducted according to a selection that is determined by a basic setting. For example, whether to store the original data is inquired of the user using a popup window, or a selection screen for selecting whether to store may be displayed on the user interface 150.

In operation 803, when storing of the original data is selected, the original data can be stored in the storage unit 120. In the storage unit 120, a storage space such as the document box 121 exists, and if the original data is stored in the document box 121, the user can generate and output data having the original data with the original data when the user wants or at a predetermined time.

In operations 804*a* and 804*b*, the control unit 130 adds image data of a security mark to at least one of the data obtained in operation 801 and data stored in the storage unit 120 to generate a second document. That is, in operation 804*a*, the control unit 130 can add image data of a security mark to the data stored in the document box 121 of the storage unit 120. The control unit 130 can generate a second document according to a property of additional information of the document box 121 in which the first document is stored. In operation 804*b*, the control unit 130 can add image data of a security mark to the data obtained in operation 801.

In operation 805, the control unit 130 can store the data to which the security mark is added in the storage unit 120 with the document box 121 included in the storage unit 120. That is, the control unit 130 can store the second document generated in operation 804*b* in the document box 121 of the storage unit 120.

In operation 806, the transmission unit 122 transmits the second document generated in operation 804*a* or 804*b*.

According to the method described above, since the data that includes a security mark is generated, stored, and transmitted in the image forming apparatus 10, the data that includes the security mark can be transmitted via e-mail, a fax, a server, etc. Accordingly, not only the security of printed results on paper but also the security of electronic documents that are transmitted or received through a network can be increased.

As described above in connection with the example embodiments of the present general inventive concept, an additional information-added document can be generated and stored in the image forming apparatus 10, and thus the additional information-added document can be transmitted at a time point when the user wants or at any other predetermined time. Also, a document to which a security mark corresponding to additional information is added can be transmitted when performing e-mail transmission, fax transmission, file transfer protocol (FTP), or transmission via a server, and a security policy can be applied to a document printed on paper and to data that is generated and transmitted using the image forming apparatus.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

While this present general inventive concept has been particularly illustrated and described with reference to exemplary embodiments thereof, it will be understood by those of ordinary skill in the art that various changes in form and details may be made therein without departing from the spirit and scope of the present general inventive concept as defined by the appended claims. The exemplary embodiments should be considered in descriptive sense only and not for purposes of limitation. Therefore, the scope of the present general inventive concept is defined not by the detailed description of the present general inventive concept but by the appended claims, and all differences within the scope will be construed as being included in the present general inventive concept.

What is claimed is:

1. A method of generating an additional information-added document of an image forming apparatus including at least one document box, the method comprising:
   receiving a property of the additional information of each of the at least one document box in the image forming apparatus;
   storing a first document, which is an object document, to one of the at least one document box according to a property of the first document;
   generating a second document by inserting additional information corresponding to a property that is set in the document box in which the first document is stored, to the first document; and
   storing the second document.

2. The method of claim 1, wherein at least one of the group consisting of the generated second document and the stored second document is transmitted to at least one receiving device according to a preset manipulation.

3. The method of claim 2, wherein in the transmitting, the transmission is at least one of the group consisting of fax transmission, file transfer protocol (FTP) transmission, e-mail transmission, transmission to a predetermined server, and printing.

4. The method of claim 2, wherein the preset manipulation is input received from a user interface or a controller.

5. The method of claim 2, further comprising providing a transmission result to the at least one receiving device to be displayed.

6. The method of claim 1, wherein in the inputting of a property, at least one of the group consisting of a pattern corresponding to the property of the additional information, a position of the pattern, and a size of the pattern is input, and the pattern is stored in the image forming apparatus or in a host device corresponding to the image forming apparatus.

7. The method of claim 6, wherein the inputting of a property comprises:
   receiving the property from a graphic user interface (GUI) of the image forming apparatus or a web user interface (UI) of the host device corresponding to the image forming apparatus.

8. The method of claim 1, wherein the first document is at least one of the group consisting of scanning data obtained through scanning, fax data received via a fax, copy data obtained through copying, data received from a portable storage medium connected to the image forming apparatus, received e-mail data, and data received from a host device corresponding to the image forming apparatus.

9. The method of claim 1, wherein the second document is one of the group consisting of a new document, which is the first document to which additional information corresponding to the property is added, and a updated document that is updated by adding additional information corresponding to the property to the first document.

10. An image forming apparatus to add additional information to a first document, which is an object document, comprising:
    a receiving unit to receive the first document;
    a storing unit in which at least one of the group consisting of the received first document, a second document to which the additional information is added, at least one pattern corresponding to a property of the additional information, and at least one document box is stored;
    a user interface to receive a property of the additional information that is set in each of the at least one document box; and
    a control unit to store the first document to one of the at least one document box according to a property of the first document and generate the second document by inserting additional information corresponding to the property set in each of the at least one document box, in which the first document is stored, to the first document.

11. The image forming apparatus of claim 10, further comprising:
    a transmission unit to transmit the second document to the at least one receiving device corresponding to a selection in the user interface,
    wherein the at least one receiving device where the second document is transmitted is determined according to a selection received from the user interface.

12. The image forming apparatus of claim 10, wherein the user interface receives an input of at least one of the group consisting of a pattern corresponding to the property of the additional information, a position of the pattern, and a size of the pattern, and
    the received input pattern is stored in a host device corresponding to the image forming apparatus.

13. The image forming apparatus of claim 12, wherein at least one of the group consisting of the pattern corresponding to the property of the additional information, the position of the pattern, and the size of the pattern is received as input from a graphic user interface (GUI) of the user interface or a web user interface (UI) of the host device corresponding to the image forming apparatus.

14. The image forming apparatus of claim 10, wherein the receiving unit receives at least one of the group consisting of scanning data obtained through scanning, fax data received via a fax, copy data obtained through copying, data received from a portable storage medium connected to the image forming apparatus, received e-mail data, and data received from a host device corresponding to the image forming apparatus, as the first document, which is an object document.

15. The image forming apparatus of claim 11, wherein the transmission unit performs at least one of the group consisting of fax transmission, file transfer protocol (FTP) transmission, e-mail transmission, transmission to a predetermined server, and printing.

16. A system to generate an additional information-added document, comprising:
    a host device to transmit at least one of the group consisting of a first document, which is an object document, and information that sets an additional information property of at least one document box in an image forming apparatus; and an image forming apparatus to receive the first document, to store the received first document to the at least one document box of the image forming apparatus according to a property of the first document, and to generate a second document by inserting additional information according to a property of an additional information of the document box in which the first document box is stored, to the first document, and to store the generated second document, wherein the additional information includes image data which indicates the second document is a security document.

17. The system of claim 16, wherein the image forming apparatus transmits the second document to the at least one receiving device according to a received preset manipulation.

18. A method of generating an additional information-added document, the method comprising:

receiving a property of the additional information with an image forming apparatus;

receiving a first document including at least one object with the image forming apparatus and storing the first document which is an object document, to one of the at least one document box of the image forming apparatus according to a property of the first document;

generating a second document with the image forming apparatus by inserting additional information according to the received property to the first document; and storing the second document, wherein the additional information includes image data which indicates the second document is a security document.

19. A method of generating an additional information-added document, the method comprising:

receiving data of a first document with an image forming apparatus;

storing the first document, which is an object document, to one of at least one document box of the image forming apparatus according to a property of the first document;

generating a second document with the image forming apparatus by inserting image data of a security mark to the received data; and storing the generated second document in a storage unit.

20. An image forming apparatus to add additional information to a first document received and stored by the image forming apparatus in a storing unit, comprising:

a user interface to receive an input of a property of the additional information that is set in the at least one document box; and a control unit to store the first document, which is an object document, to one of the at least one document box according to a property of the first document and generate a second document by inserting additional information corresponding to the property set in the at least one document box to the first document and to store the second document in the storing unit, wherein the additional information includes image data which indicates the second document is a security document.

* * * * *